United States Patent
Bittar et al.

(10) Patent No.: US 9,085,959 B2
(45) Date of Patent: Jul. 21, 2015

(54) METHOD AND APPARATUS FOR RESISTIVITY MEASUREMENTS

(75) Inventors: Michael S. Bittar, Houston, TX (US); Vadim Minosyan, Houston, TX (US); Gary E. Weaver, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 223 days.

(21) Appl. No.: 13/262,106

(22) PCT Filed: Jan. 22, 2010

(86) PCT No.: PCT/US2010/021715
§ 371 (c)(1),
(2), (4) Date: Sep. 29, 2011

(87) PCT Pub. No.: WO2011/090480
PCT Pub. Date: Jul. 28, 2011

(65) Prior Publication Data
US 2012/0024600 A1    Feb. 2, 2012

(51) Int. Cl.
*E21B 47/01*    (2012.01)
*E21B 47/12*    (2012.01)
*G01V 3/30*    (2006.01)

(52) U.S. Cl.
CPC .............. *E21B 47/01* (2013.01); *E21B 47/122* (2013.01); *G01V 3/30* (2013.01)

(58) Field of Classification Search
CPC ..... E21B 47/01; E21B 47/011; E21B 47/122; E21B 47/16; E21B 47/18; G01V 3/30; G01V 3/28
USPC ............................................ 175/50, 408, 327
See application file for complete search history.

(56) References Cited

U.S. PATENT DOCUMENTS

| | | |
|---|---|---|
| 2,901,689 A | 8/1959 | Barrett |
| 3,014,177 A | 12/1961 | Hungerford et al. |

(Continued)

FOREIGN PATENT DOCUMENTS

| | | |
|---|---|---|
| EP | 0840142 | 5/1998 |
| FR | 2699286 | 6/1994 |

(Continued)

OTHER PUBLICATIONS

Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006), pp. 1-14.

(Continued)

*Primary Examiner* — Jennifer H Gay
(74) *Attorney, Agent, or Firm* — McGuireWoods LLP

(57) ABSTRACT

An apparatus for measuring a resistivity of a formation comprising an instrumented bit assembly coupled to a bottom end of the apparatus. At least one first electromagnetic wave antenna transmits an electromagnetic wave signal into the formation. At least one second electromagnetic wave antenna located on the instrumented bit assembly and longitudinally spaced apart from the at least one first electromagnetic wave antenna receives the electromagnetic wave signal transmitted through the formation. Electronic circuitry is operably coupled to the at least one second electromagnetic wave antenna to process the received signal to determine a resistivity of the formation proximate the instrumented bit assembly.

23 Claims, 11 Drawing Sheets

(56) References Cited

U.S. PATENT DOCUMENTS

| | | | |
|---|---|---|---|
| 3,187,252 A | 6/1965 | Hungerford |
| 3,286,163 A | 11/1966 | Holser et al. |
| 3,412,815 A | 11/1968 | Holser |
| 3,510,757 A | 5/1970 | Huston |
| 3,539,911 A | 11/1970 | Youmans et al. |
| 3,561,007 A | 2/1971 | Gouilloud et al. |
| 3,808,520 A | 4/1974 | Runge |
| 3,982,176 A | 9/1976 | Meador |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| RE32,913 E | 4/1989 | Clark |
| 4,845,433 A | 7/1989 | Kleinberg |
| 4,873,488 A | 10/1989 | Barber et al. |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,962,490 A | 10/1990 | Lyle et al. |
| 4,980,643 A | 12/1990 | Gianzero et al. |
| 5,089,779 A | 2/1992 | Rorden |
| 5,115,198 A | 5/1992 | Gianzero et al. |
| 5,160,925 A | 11/1992 | Dailey et al. |
| 5,200,705 A | 4/1993 | Clark et al. |
| 5,210,495 A | 5/1993 | Hapashey et al. |
| 5,230,386 A | 7/1993 | Wu et al. |
| 5,239,448 A | 8/1993 | Perkins et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,339,036 A * | 8/1994 | Clark et al. ............ 324/338 |
| 5,389,881 A | 2/1995 | Bittar et al. |
| 5,402,068 A | 3/1995 | Meador et al. |
| 5,428,293 A | 6/1995 | Sinclair et al. |
| 5,442,294 A | 8/1995 | Rorden |
| 5,485,089 A | 1/1996 | Kuckes |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,589,775 A | 12/1996 | Kuckes |
| 5,594,343 A | 1/1997 | Clark et al. |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,854,991 A | 12/1998 | Gupta et al. |
| 5,886,526 A | 3/1999 | Wu |
| 5,892,460 A | 4/1999 | Jerabek et al. |
| 5,923,170 A | 7/1999 | Kuckes |
| 5,924,499 A * | 7/1999 | Birchak et al. ............ 175/40 |
| 5,999,883 A | 12/1999 | Gupta et al. |
| 6,044,325 A | 3/2000 | Chakravarthy et al. |
| 6,064,210 A | 5/2000 | Sinclair |
| 6,147,496 A | 11/2000 | Strack et al. |
| 6,158,532 A | 12/2000 | Logan et al. |
| 6,163,155 A | 12/2000 | Bittar |
| 6,181,138 B1 | 1/2001 | Hagiwara et al. |
| 6,191,586 B1 | 2/2001 | Bittar |
| 6,218,841 B1 | 4/2001 | Wu |
| 6,218,842 B1 | 4/2001 | Bittar |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 | 11/2002 | Bittar |
| 6,538,447 B2 | 3/2003 | Bittar |
| 6,541,979 B2 | 4/2003 | Omeragic |
| 6,564,883 B2 * | 5/2003 | Fredericks et al. ............ 175/50 |
| 6,566,881 B2 | 5/2003 | Omeragic et al. |
| 6,573,722 B2 | 6/2003 | Rosthal et al. |
| 6,614,229 B1 | 9/2003 | Clark et al. |
| 6,710,600 B1 | 3/2004 | Kopecki et al. |
| 6,736,222 B2 | 5/2004 | Kuckes et al. |
| 6,777,940 B2 | 8/2004 | Macune |
| 6,810,331 B2 | 10/2004 | Bittar et al. |
| 6,850,068 B2 * | 2/2005 | Chemali et al. ............ 324/369 |
| 6,863,127 B2 | 3/2005 | Clark et al. |
| 6,885,943 B2 | 4/2005 | Bittar et al. |
| 6,900,640 B2 | 5/2005 | Fanini et al. |
| 6,909,667 B2 | 6/2005 | Shah et al. |
| 6,911,824 B2 | 6/2005 | Bittar |
| 6,944,546 B2 | 9/2005 | Xiao et al. |
| 7,019,528 B2 | 3/2006 | Bittar |
| 7,038,455 B2 | 5/2006 | Beste et al. |
| 7,046,010 B2 | 5/2006 | Hu et al. |
| 7,063,141 B2 | 6/2006 | Masak |
| 7,138,803 B2 | 11/2006 | Bittar |
| 7,202,670 B2 | 4/2007 | Omeragic et al. |
| 7,207,215 B2 | 4/2007 | Spross et al. |
| 7,227,363 B2 | 6/2007 | Gianzero et al. |
| 7,265,552 B2 | 9/2007 | Bittar |
| 7,350,568 B2 | 4/2008 | Mandal et al. |
| 7,394,257 B2 | 7/2008 | Martinez et al. |
| 7,538,555 B2 | 5/2009 | Banning et al. |
| 7,557,579 B2 | 7/2009 | Bittar |
| 7,786,733 B2 | 8/2010 | Seydoux et al. |
| 7,848,887 B2 | 12/2010 | Yang et al. |
| 7,948,238 B2 | 5/2011 | Bittar |
| 8,581,592 B2 * | 11/2013 | Bittar et al. .................... 324/338 |
| 2002/0134587 A1 * | 9/2002 | Rester et al. .................... 175/48 |
| 2003/0051914 A1 | 3/2003 | Bittar |
| 2003/0055565 A1 | 3/2003 | Omeragic |
| 2003/0076107 A1 | 4/2003 | Fanini et al. |
| 2004/0196047 A1 | 10/2004 | Fanini et al. |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0140373 A1 | 6/2005 | Li et al. |
| 2005/0200498 A1 * | 9/2005 | Gleitman .................... 340/854.4 |
| 2005/0218898 A1 | 10/2005 | Fredette et al. |
| 2006/0011385 A1 | 1/2006 | Seydoux et al. |
| 2006/0015256 A1 | 1/2006 | Hassan et al. |
| 2006/0125479 A1 | 6/2006 | Chemali et al. |
| 2006/0157277 A1 * | 7/2006 | Bittar et al. ..................... 175/26 |
| 2006/0175057 A1 * | 8/2006 | Mandal et al. ............. 166/254.2 |
| 2006/0244455 A1 | 11/2006 | Bittar |
| 2006/0272859 A1 | 12/2006 | Pastusek et al. |
| 2007/0186639 A1 * | 8/2007 | Spross et al. ............... 73/152.03 |
| 2007/0278008 A1 | 12/2007 | Kuckes et al. |
| 2008/0078580 A1 | 4/2008 | Bittar |
| 2008/0136419 A1 | 6/2008 | Seydoux et al. |
| 2008/0258733 A1 | 10/2008 | Bittar |
| 2008/0278169 A1 | 11/2008 | Bittar |
| 2009/0015260 A1 | 1/2009 | Bittar |
| 2009/0015261 A1 * | 1/2009 | Yang et al. .................... 324/343 |
| 2009/0179648 A1 * | 7/2009 | Fredette et al. ............. 324/342 |
| 2009/0224764 A1 | 9/2009 | Bittar |
| 2009/0230968 A1 | 9/2009 | Bittar et al. |
| 2009/0302851 A1 * | 12/2009 | Bittar et al. .................... 324/338 |
| 2010/0127708 A1 | 5/2010 | Bittar |

(56) References Cited

U.S. PATENT DOCUMENTS

| | | | |
|---|---|---|---|
| 2011/0234230 A1* | 9/2011 | Bittar et al. | 324/333 |
| 2012/0024600 A1* | 2/2012 | Bittar et al. | 175/50 |
| 2013/0248250 A1* | 9/2013 | Bittar et al. | 175/45 |

FOREIGN PATENT DOCUMENTS

| | | |
|---|---|---|
| WO | WO-95/31736 | 11/1995 |
| WO | WO-98/00733 | 1/1998 |

OTHER PUBLICATIONS

Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figs.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs of Figs.

Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, Jun. 19-22, 1994, (Jun. 19, 1994), 18 pgs.

Bittar,, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.

Bonner, S. et al., "A New Generation of Electrode Resistivity Measurements for Formation Evaluation While Drilling", SPWLA 35th Annual Logging Symposium, (Jun. 19, 1994), pp. 1-19.

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", SPE Formation Evaluation, (Sep. 1990), pp. 263-271.

Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5 , plus 3 pgs. of Figs.

Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.

Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.

Mack, S. G., et al., "MWD Tool Accurately Measures Four Resistivities", Oil & Gas Journal, (May 25, 1992), pp. 1-5.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, 17 pgs.

Meyer, W. H., "New Two Frequency Propagation Resistivity Tools", SPWLA 36th Annual Logging Symposium, (Jun. 26-29, 1995), 12 pgs.

Rodney, Paul F., et al., "Electromagnetic Wave Resistivity MWD Tool", SPE Drilling Engineering, (Oct. 1986), pp. 37-346.

Zhu, Tianfei et al., "Two Dimensional Velocity Inversion and Synthetic Seismogram Computation", Geophysics, vol. 52, No. 1, (Jan. 1987), pp. 37-49.

International Search Report and the Written Opinion, dated Mar. 17, 2010, Appl No. PCT/US2010/021715, Method and Apparatus for Resistivity Measurements, filed Feb. 22, 2010, 8 pgs.

* cited by examiner

METHOD AND APPARATUS FOR RESISTIVITY MEASUREMENTS

BACKGROUND OF THE INVENTION

For a formation to contain hydrocarbons and permit the hydrocarbons to flow through it, the rock comprising the formation must have certain well known physical characteristics. One characteristic is that the formation has a certain measurable resistivity (the inverse of conductivity), which can be determined by appropriate transducers in the drill string. Analysis of the data from these transducers provide information regarding the resistivity of the formation surrounding the resistivity tool, which then can be used in combination with other measurements to predict whether the formation will produce hydrocarbons. In addition, a sudden measured change in resistivity at the boundary between various strata can be used to locate these boundaries.

Because the drilling mud in the borehole is commonly maintained at a higher pressure than the formation, the mud tends to invade the permeable formation surrounding the borehole, forcing the original connate water to be driven away from the borehole. This flushing of drilling mud filtrate into the formation creates an invaded or flushed zone around the borehole, with a transition zone between the flushed and undisturbed zones. This invasion may effect accurate measurements of formation resistivity. The depth of invasion of the drilling mud is a factor of the formation porosity, the differential drilling pressure, permeability of the formation, water loss of the drilling fluid, and time. In order to reduce the invasion effects, it is desirable to measure the resistivity as close to the bit as possible. To detect strata boundaries, it is desirable to detect formation resistivity ahead of the bit.

BRIEF DESCRIPTION OF THE DRAWINGS

A better understanding of the present invention can be obtained when the following detailed description of example embodiments are considered in conjunction with the following drawings, in which.

DETAILED DESCRIPTION

Figure 1:
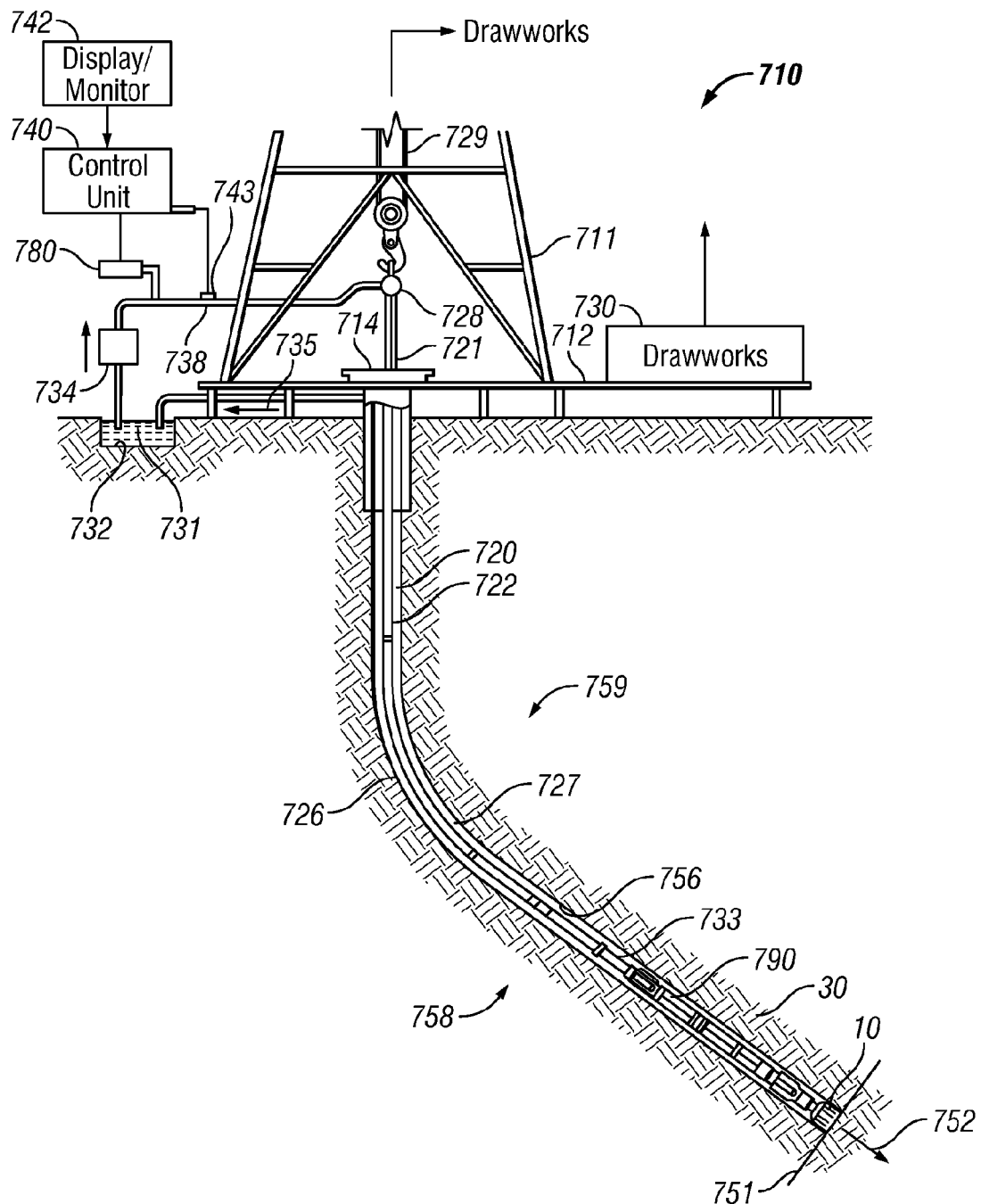
FIG. 1 shows a schematic diagram of a drilling system.

FIG. 1 shows a schematic diagram of a drilling system 710 having a downhole assembly according to one embodiment of present invention. As shown, the system 710 includes a conventional derrick 711 erected on a derrick floor 712 which supports a rotary table 714 that is rotated by a prime mover (not shown) at a desired rotational speed. A drill string 720 that includes a drill pipe section 722 extends downward from rotary table 714 into a borehole 726. Borehole 726 may travel in a three-dimensional path. The three-dimensional direction of the bottom 751 of borehole 726 is indicated by a pointing vector 752. In one example, an instrumented drill bit assembly 10 is attached at the downhole end of drill string 720 and disintegrates the geological formation 30 when instrumented drill bit assembly 10 is rotated. The drill string 720 is coupled to a drawworks 730 via a kelly joint 721, swivel 728 and line 729 through a system of pulleys (not shown). During the drilling operations, drawworks 730 is operated to control the weight on instrumented drill bit assembly 10 and the rate of penetration of drill string 720 into borehole 726. The operation of drawworks 730 is well known in the art and is thus not described in detail herein. In one example, instrumented drill bit assembly 10 may be rotated only by a downhole motor 790. In another example, instrumented drill bit assembly 10 may be rotated by the combined action of rotary table 714 and downhole motor 790. Alternatively, a top drive assembly (not shown) may be used instead of rotary table 714.

During drilling operations a suitable drilling fluid (commonly referred to in the art as "mud") 731 from a mud pit 732 is circulated under pressure through drill string 720 by a mud pump 734. Drilling fluid 731 passes from mud pump 734 into drill string 720 via fluid line 738 and kelly joint 721. Drilling fluid 731 is discharged at the borehole bottom 751 through an opening in instrumented drill bit assembly 10. Drilling fluid 731 circulates uphole through the annular space 727 between drill string 720 and borehole 726 and is discharged into mud pit 732 via a return line 735. Preferably, a variety of sensors (not shown) are appropriately deployed on the surface according to known methods in the art to provide information about various drilling-related parameters, such as fluid flow rate, weight on bit, hook load, etc.

A surface control unit 740 may receive signals from downhole sensors and devices via a sensor 743 placed in fluid line 738, and processes such signals according to programmed instructions provided to surface control unit 740. Surface control unit 740 may display desired drilling parameters and other information on a display/monitor 742 which may be used by an operator to control the drilling operations. Surface control unit 740 may contain a computer, memory for storing data, a data recorder and other peripherals. Surface control unit 740 may also include models and may process data according to programmed instructions, and respond to user commands entered through a suitable input device, such as a keyboard (not shown).

In one example embodiment of the present invention, a steerable drilling bottom hole assembly (BHA) 759 may comprise a measurement while drilling (MWD) system 758 comprising various sensors to provide information about the formation 30 and downhole drilling parameters. BHA 759 may be coupled between the instrumented drill bit assembly 10 and the drill pipe 722. BHA 759 may also comprise a drilling motor 790.

MWD sensors in BHA 759 may comprise sensors for measuring the formation resistivity proximate instrumented drill bit assembly 10, a gamma ray device for measuring the formation gamma ray intensity, sensors for determining the inclination and azimuth of the drill string, and pressure sensors for measuring drilling fluid pressure downhole. The above-noted devices may transmit data to a downhole transmitter 733, which in turn transmits the data uphole to the surface control unit 740. In one embodiment a mud pulse telemetry technique may be used to communicate data from downhole sensors and devices during drilling operations. A transducer 743 placed in the mud supply line 738 detects the mud pulses responsive to the data transmitted by the downhole transmitter 733. Transducer 743 generates electrical signals in response to the mud pressure variations and transmits such signals to surface control unit 140. Alternatively, other telemetry techniques such as electromagnetic and/or acoustic techniques or any other suitable technique known in the art may be utilized for the purposes of this invention. In one embodiment, hard wired drill pipe may be used to communicate between the surface and downhole devices. In one example, combinations of the techniques described may be used. In one embodiment, a surface transmitter/receiver 780 communicates with downhole tools using any of the transmission techniques described, for example a mud pulse telemetry technique. This may enable two-way communication between surface control unit 740 and the downhole tools described below.

Figure 2:
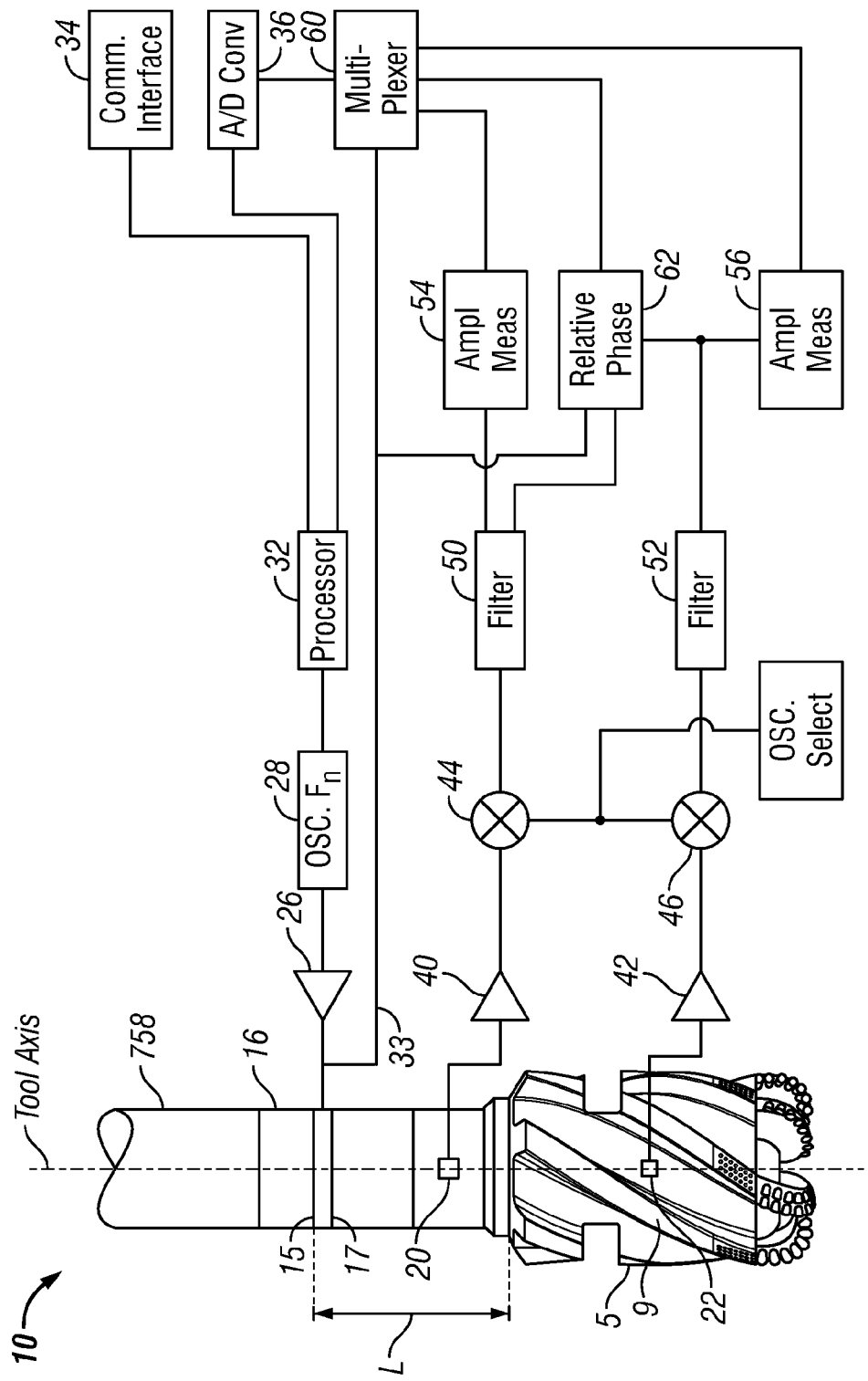
FIG. 2 shows an example of one embodiment of an instrumented bit assembly.

In one embodiment, see FIG. 2, an instrumented bit assembly 10 is attached to the lower end of BHA 759. Instrumented bit assembly 10 may comprise an electromagnetic wave (EW) antenna 15, located in a circumferential groove, or recess, in bit sub 16 that is attached to bit 5. EW antenna 15 may be enabled to transmit and/or receive EW signals. As used in the example of FIG. 2, EW antenna 15 acts as a transmitter. The circumferential groove may be located in a plane oriented at about 90° from the longitudinal tool axis. Alternatively, groove 17 may be located in a reduced section of an extended gage bit. In one example, EW antenna 15 comprises a circumferential loop of wire, as discussed below. EW antenna 15 may be covered with a non-conductive material, as is known in the art. In one embodiment, transmitter antenna 15 may be designed to operate at more than one frequency. Operating frequency may be in the range of about 1 kHz to about 10 MHz. The use of such EW resistivity techniques allows for resistivity determination in the presence of conductive or non-conductive drilling fluids, for example oil based or water based muds. In the embodiment shown in FIG. 2, coil receivers 20 and 22 are spaced apart axially as shown. At least one of the receivers may be located in the passage between blades 9. It is understood that in this and subsequent figures, formation 30 (not shown for clarity) is in contact with one or all of the blades 9. In one embodiment coil receivers 20 and 22 are located axially in a line that is substantially parallel to a longitudinal tool centerline, also called a longitudinal tool axis.

The distance between EW antenna 15 and the approximate midpoint between receiver 20 and receiver 22 is designated L. In one example, L may be on the order of 1 foot. In another example, the distance L may be ≤3 feet. One skilled in the art will appreciate that the depth of investigation into the formation is related to the spacing between the a transmitting antenna and the receivers.

As shown in FIG. 2, EW antenna 15 is coupled to amplifier 26 which is in turn driven by oscillator 28, under the control of processor 32. Processor 32 interfaces with the communication interface circuit 34 and analog to digital converter 36. Communication interface 34 may provide an interface with a mud pulse transmitter 733 in BHA 759.

Receivers 20 and 22 are respectively connected to amplifiers 40 and 42, and mixer circuits 44 and 46. The outputs of mixer circuits 44 and 46 drive low pass filters 50 and 52, respectively. The outputs of amplitude measurement circuits 54 and 56 are connected to a multiplexer 60. The outputs of low pass filter circuits 50 and 52 are also connected to the inputs of a relative phase measurement circuit 62, the output of which is fed into multiplexer 60. Amplitude measurement 54 provides a measure of amplitude signal received by receiver 20, whereas amplitude measurement 56 measures the amplitude of the incoming signal received by receiver 22. Similarly, relative phase measurement circuit 62 provides an indication of the phase difference between signals received at receiver 20 and the signals received at receiver 22. One skilled in the art will appreciate that the ratio of amplitude measurements and the relative phase measurement are both indicative of formation resistivity proximate the receivers 20 and 22 in bit assembly 10. Receivers 20 and 22 detect an azimuthal resistivity.

In another embodiment, still referring to FIG. 2, the transmitter signal 33 may be fed into multiplexer 60 and phase comparator 62. The ratio of the transmitted amplitude to the amplitude at either receiver 20, 22, and the phase difference between the transmitted signal and phase at either receiver may be compared to determine a formation resistivity between the transmitter and the selected receiver.

By combining the resistivity measurements with suitable directional measurements, an image of the borehole may be generated using multiple readings as the bit rotates around the borehole. By placing multiple receiver pairs, for example 6 pairs, around the circumference of bit assembly 10, the radial resistivity of the formation at the bit may be calculated.

Figure 3A:
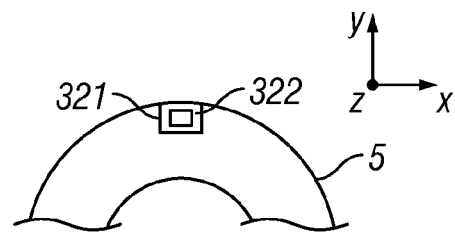
FIG. 3A shows a cross section of a portion of an instrumented bit showing a location of a receiver.
Figure 3B:
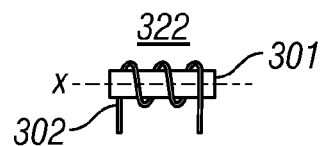
FIGS. 3B-3D show example orientations of a receiver in an instrumented bit.
Figure 3C:
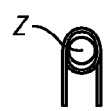
Figure 3D:

Examples of receivers 20 and 22 are shown in FIGS. 3A-3D. FIG. 3A shows a cross section of a portion of bit 5, with a receiver 322 in a cavity 321 in the outer surface of bit 5. As shown in FIGS. 3B-3D, the receiver comprises a magnetic core 301 surrounded by a wire coil 302. The receiver 322 may be oriented along different axes, as shown, to measure different components of the electromagnetic signal.

As shown in FIGS. 2 and 3A, in one example, the receivers axe mounted in the reduced diameter of the back end of bit 5 (receiver 20) or in the troughs between the near gage blades 9 on bit 5. This location provides protection of the receivers from direct contact with the borehole wall 756.

Figure 4:
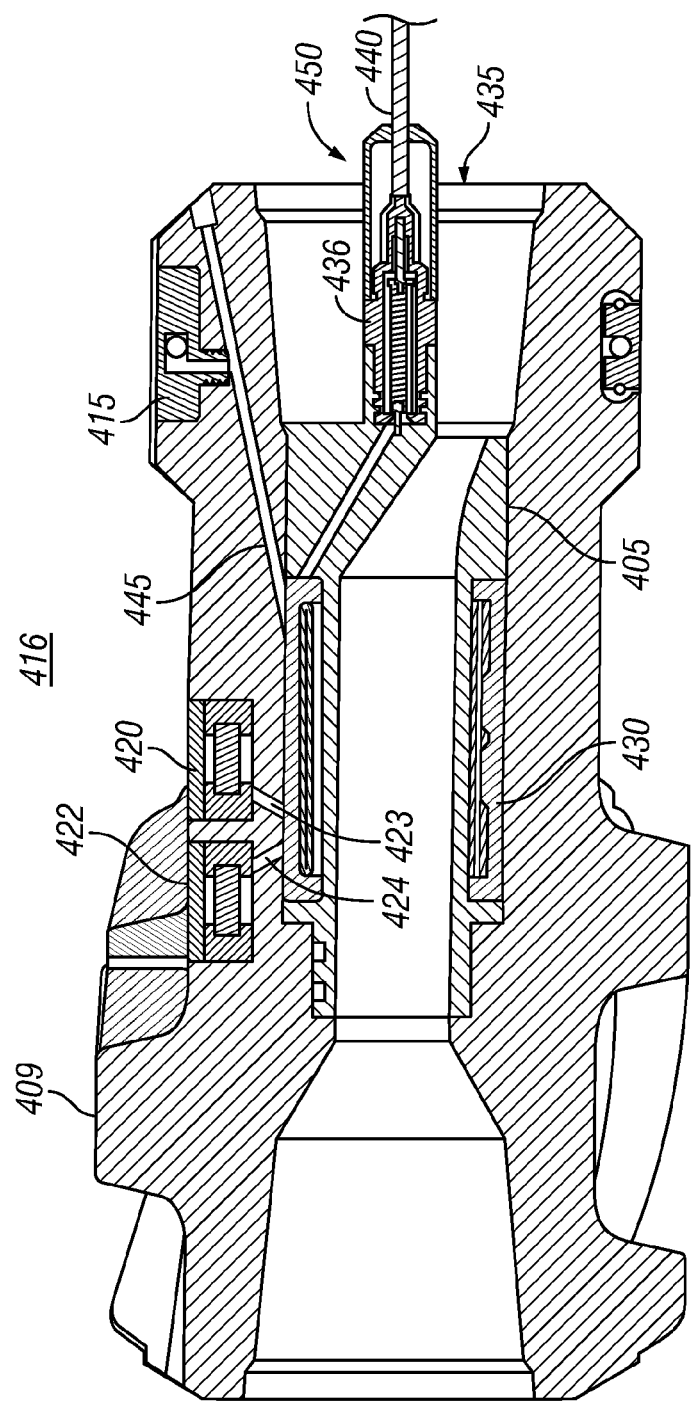
FIG. 4 shows another example of a bit sub.

FIG. 4 shows another example of a bit sub 416 having a transmitter 415 and receivers 420 and 422 mounted thereon. Bit sub 416 may be mounted to bit 5. The transmitter and receivers may be similar to those described above. Also shown is an electronics insert 405 having electronics circuits 430, for example those described in FIG. 2, for controlling the measurement of resistivity and communicating the results to a suitable telemetry device for transmission to the surface.

In one example, power and communication signals are transmitted between electronics 430 and an MWD telemetry transmitter 733 via a monocable system 450 placed in the bore of the BHA 759. In one embodiment, a spider assembly 435 positions connector 436 in the flow path. Monocable 440 is connected to spider assembly 435 and a similar spider assembly uphole proximate MWD transmitter 733. Alternatively, wired pipe may be used to transmit power and communication signals. In one example, power may be provided to the sensors by downhole batteries, and known short hop telemetry techniques may be used to transmit communication signals, for example around a downhole motor. In yet another example, the downhole motor may comprise a hard wire electrical feedthrough.

Electronics 430 may comprise circuits, components and processors for powering, interfacing with, and controlling the antenna and receivers associated with instrumented bit sub 416. In addition, electronics 430 may comprise power conversion and interface electronics for receiving power and communicating over monocable 440. Electronics 430 may comprise hybrids and/or multi-chip modules to minimize space requirements, power consumption, and to improve reliability. In one example, Electronics 430 may comprise directional sensors for determining the inclination and azimuth of the instrumented bit assembly. Alternatively, such directional sensors may be located in MWD system 758.

As shown in FIG. 4, transmitter 415 may be connected to electronics 430 via pathway 445. Likewise, receivers 420 and 422 may be connected to electronics 430 via pathways 423 and 424, respectively. As described above, transmitter 415 and receivers 420 and 422, are at a recessed diameter with respect to blades 409. It will be understood by one skilled in the art that bit sub 416 may be used in conjunction with both fixed cutter bits and roller cone bits.

Figure 11:
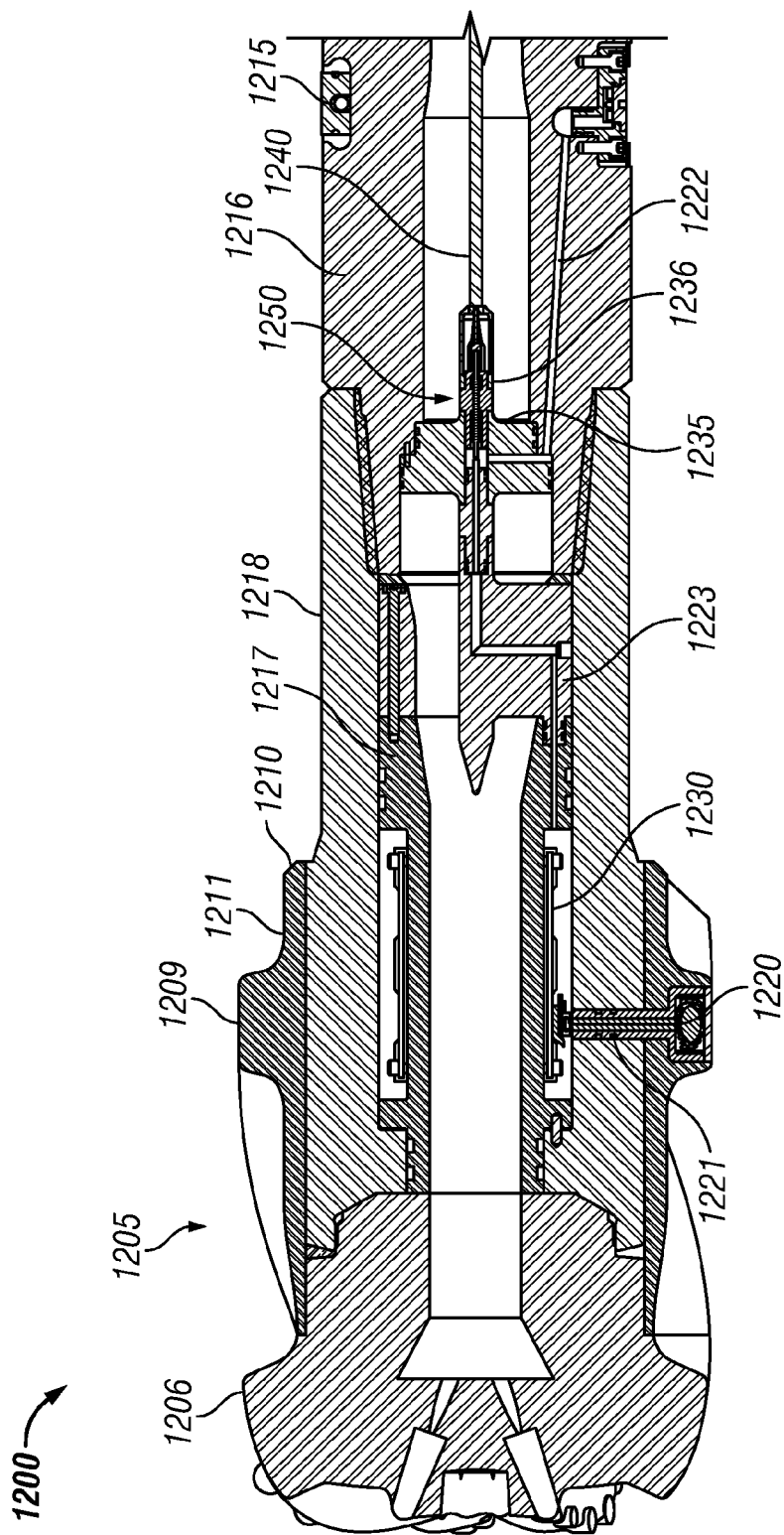
FIG. 11 shows another example of an instrumented bit assembly.

In another embodiment, see FIG. 11, an instrumented bit assembly 1200 comprises a bit assembly 1205 and a bit sub 1216. In the example shown, bit assembly 1215 comprises a bit crown 1206 attached to a bit shank 1218. A gage sleeve 1210 is mounted around bit shank 1218. Bit crown 1206 may be attached to bit shank 1218 using suitable welding techniques discussed below. Gage sleeve 1210 may be attached to bit crown 1206 and/or bit shank 1218 by any of several attachment techniques, including but not limited to, pinning, shrink fitting, and/or welding. Transmitting EW antenna 1215 transmits a signal that is detected by coil receiver 1220. While only one coil receiver is shown here, additional coil receivers may be axially and/or circumferentially spaced around bit assembly 1205. In addition, while coil receiver 1220 is shown here as located in a gage blade 1209, it is to be understood that coil receiver 1220 may be located in the reduced diameter passage 1211 between gage blades 1209 and/or the reduced diameter of the unbladed rear section of bit shank 1218. Electronics 1230 may be located in an insert 1217 that is located in a bored back section of bit shank 1218. Connection to coil receiver 1220 may be made by a connector 1221. Connection to transmitting EW antenna 1215 may be made via conductors (not shown) through pathways 1223 and 1222. Connections to uphole components may be made via a monocable system 1250 placed in the bore of the BHA 759. A spider assembly 1235 positions connector 1236 in the flow path. Monocable 1240 is connected to spider assembly 1235 and a similar spider assembly uphole, proximate uphole components. The operation of monocable system 1250 may be similar to the operation of monocable system 450. Alternatively, wired pipe may be used to transmit power and communication signals. In one example, power may be provided to the sensors by downhole batteries, and known short hop telemetry techniques may be used to transmit communication signals, for example around a downhole motor. In yet another example, the downhole motor may comprise a hard wire electrical feedthrough. It is to be understood that any of the examples presented herein may utilize electronics that are located in the bit shank and/or the bit sub.

Figure 5:
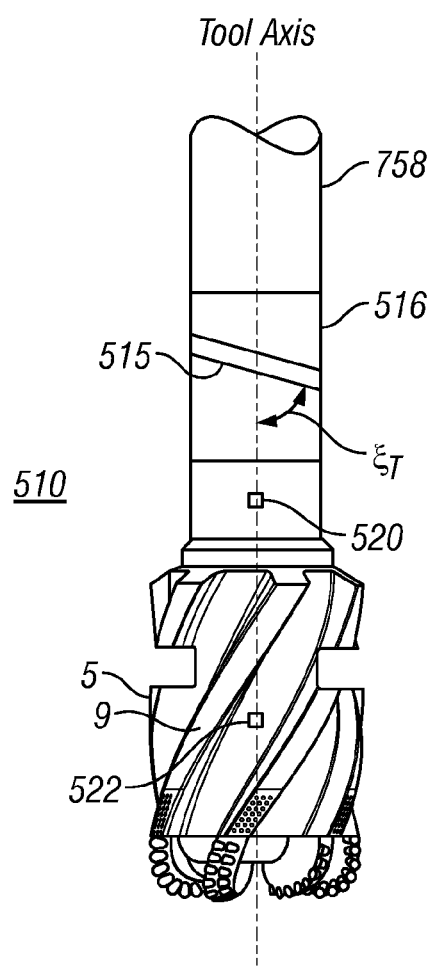
FIG. 5 shows an example of an instrumented bit assembly.

FIG. 5 shows another example of an instrumented bit assembly 510 comprising a bit sub 516 and a tilted EW antenna 515, acting as a transmitter. Transmitting EW antenna 515 is tilted such that the plane of the tilted EW antenna 515 is tilted at an angle $\xi_T$ with respect to the longitudinal axis of the downhole tool. Angle $\xi_T$ may be in the range of 0-90°. Such a system allows the determination of the horizontal resistivity, the vertical resistivity, and the relative formation dip angle. The coil receivers 520 and 522 are similar to those described previously. Tilted antennas may also enable a measure of resistivity ahead of bit 5.

Figure 12:
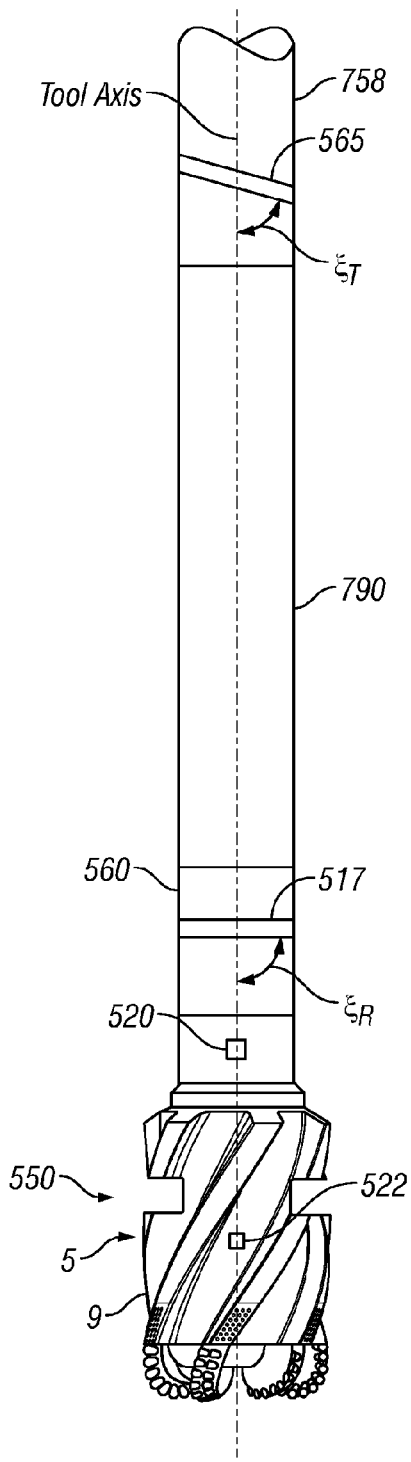
FIG. 12 shows another example of instrumented bit assembly comprising a tilted antenna.

FIG. 12 shows an example of instrumented bit assembly 550 and a tilted EW antenna 565 spaced apart from instrumented bit assembly. In the example shown, tilted antenna EW 565 may be spaced from instrumented bit assembly about 25 feet. In one example, tilted EW antenna 565 may be placed above a drilling motor 790. Alternatively, a drill collar section may separate tilted EW antenna 565 and instrumented bit assembly 550. Instrumented bit assembly 550 comprises a bit sub 560 having an EW antenna 517 that may act as a receiver and/or a transmitter mounted thereon. In one example, EW antenna 517 may receive EW signals from tilted EW antenna 565. The spacing between tilted EW antenna 565 and EW antenna 517 and the tilting of EW transmitter 515 cause the transmitted signal to propagate more deeply into the formation ahead of the bit, and the signal received at EW antenna 517 enables measurements of the formation resistivity ahead of the bit. The rotation of the tool in the wellbore during measurements may be used to provide a 360° resistivity image of the formation ahead of the bit.

In another example, EW antenna 517 may act as a transmitter to transmit electromagnetic waves that are received by coil receivers 520 and 522 that provide azimuthal resistivity and imaging at the bit.

Communication between EW antenna 565 and EW antenna 517 may be enabled by use of a monocable system as described previously with respect to FIG. 4 and FIG. 11. Alternatively, wired pipe may be used to transmit power and communication signals. In one example, power may be provided to the sensors by downhole batteries, and known short hop telemetry techniques may be used to transmit communication signals, for example around a downhole motor. In yet another example, the downhole motor may comprise a hard wire electrical feedthrough.

In another example, EW antenna 517 may be electronically switched to act as a receiver for EW signals transmitted by tilted EW antenna 565, and as a transmitter to transmit EW signals to coil receivers 520 and 522.

Figure 13:
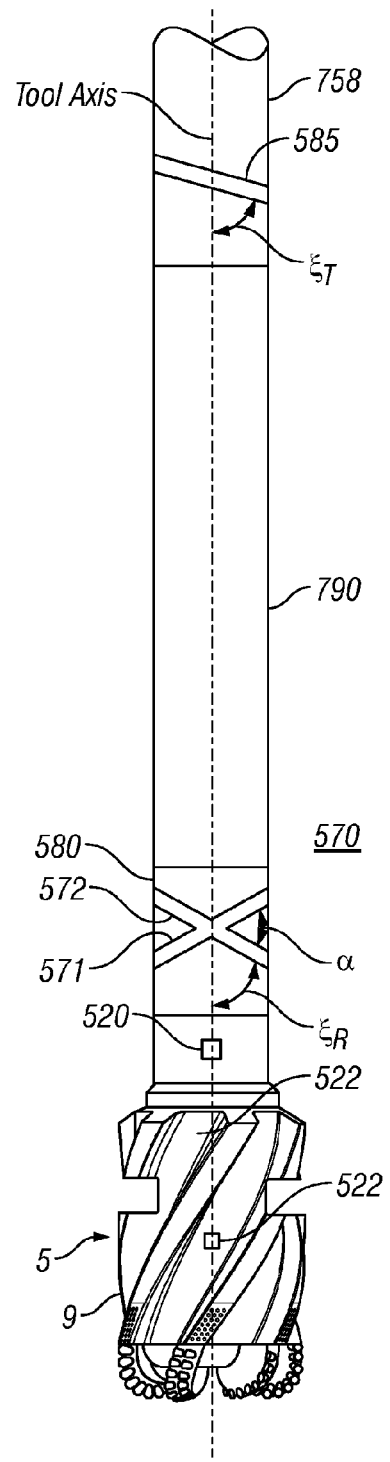
FIG. 13 shows yet another example of an instrumented bit assembly comprising a pair of crossed tilted receivers.

FIG. 13 shows another example of an instrumented bit assembly 570 and a spaced apart tilted transmitting EW antenna 585. Instrumented bit assembly 570 comprises two crossed tilted EW receiver antennas 571 and 572. The plane of tilted EW receiver antenna 572 is tilted by an angle $\xi_R$ from the longitudinal tool axis. The plane of tilted EW receiver antenna 571 is tilted by an angle α from the plane of EW receiver antenna 572. In one example, $\xi_R$ is about 45°, and α is about 90°. EW signals transmitted by transmitting EW antenna 515 are received at both EW receiver antennas 571 and 572. The signals may be processed using circuitry similar to that described with relation to FIG. 2 to compare the ratio of transmitter amplitude and received amplitude for each receiver, and the phase shift between the transmitter and each receiver to enable resistivity measurements ahead of the bit.

In another example, each EW antenna 571, 572 may act as a transmitter to transmit electromagnetic waves that are received by coil receivers 520 and 522 that provide azimuthal resistivity and imaging at the bit.

Communication between EW antenna 585 and EW antennas 571, 572 may be enabled by use of a monocable system as described previously with respect to FIG. 4 and FIG. 11. Alternatively, wired pipe may be used to transmit power and communication signals. In one example, power may be provided to the sensors by downhole batteries, and known short hop telemetry techniques may be used to transmit communication signals, for example around a downhole motor. In yet another example, the downhole motor may comprise a hard wire electrical feedthrough.

In another example, each EW antenna 571, 572 may be electronically switched to act as a receiver for EW signals transmitted by tilted EW antenna 585, and as a transmitter to transmit EW signals to coil receivers 520 and 522.

Figure 6A:
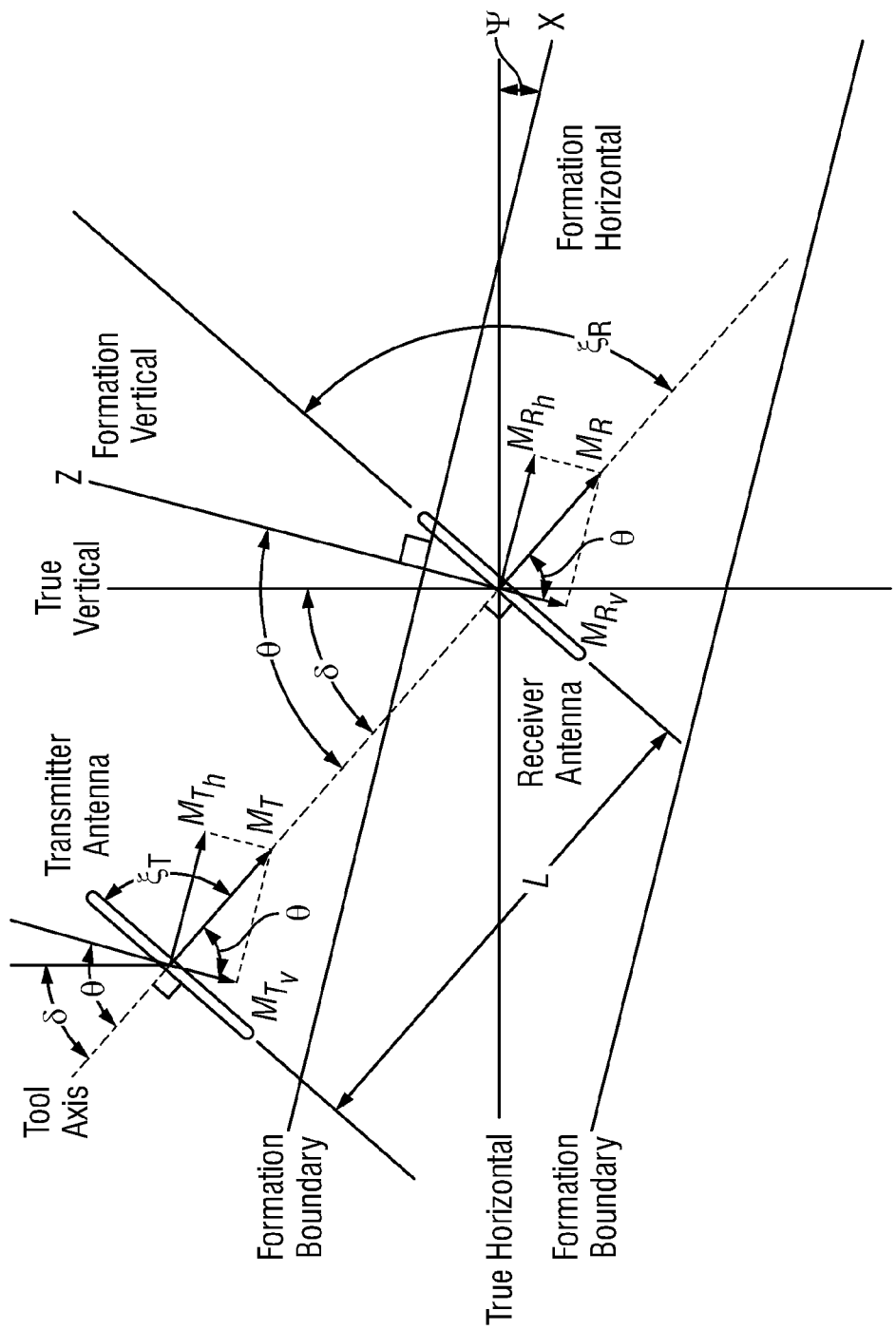
FIG. 6A shows an example geometry associated with an analysis of an untilted antenna.
Figure 6B:
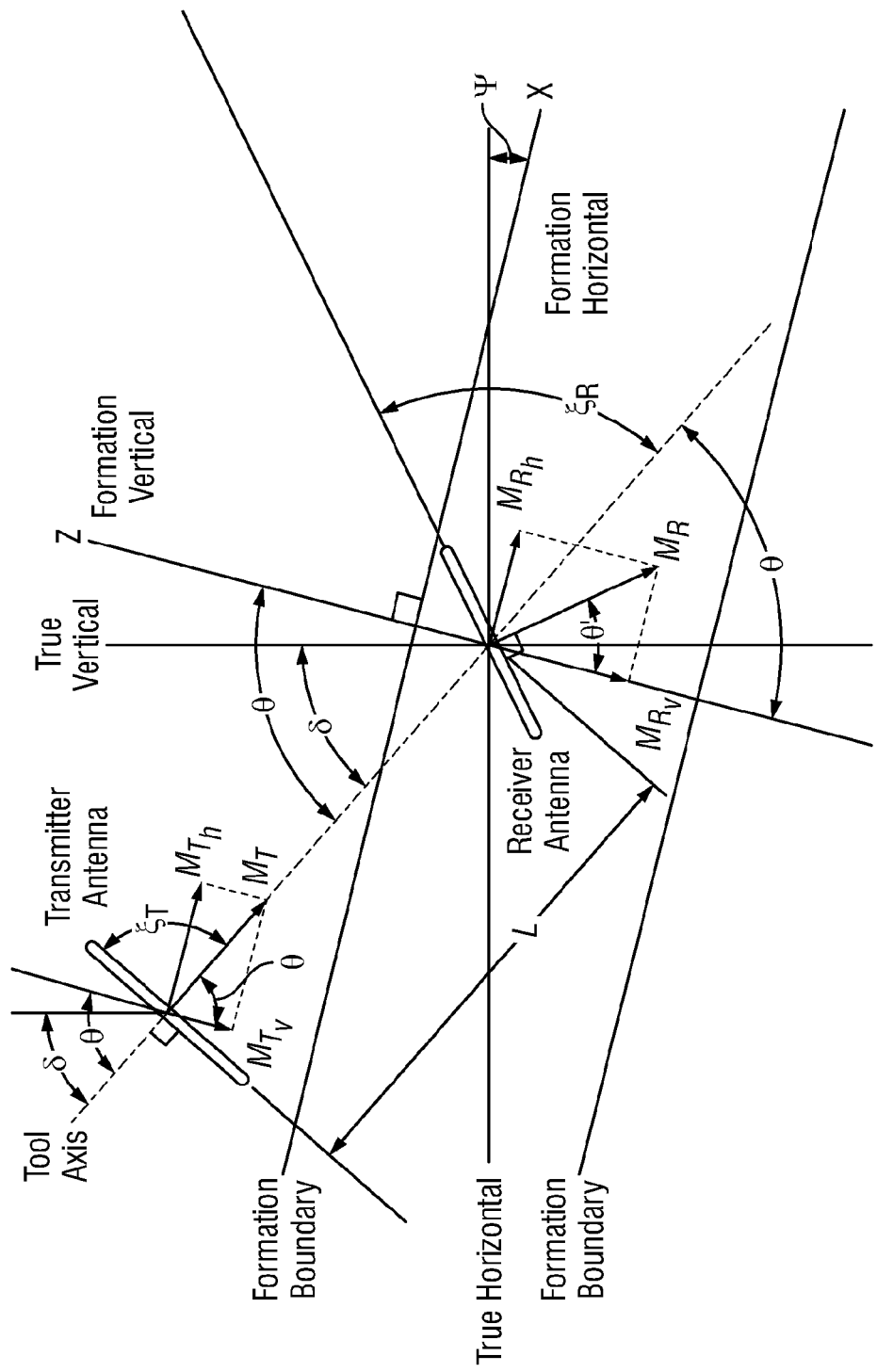
FIG. 6B shows an example geometry associated with an analysis of a tilted antenna.
Figure 10:
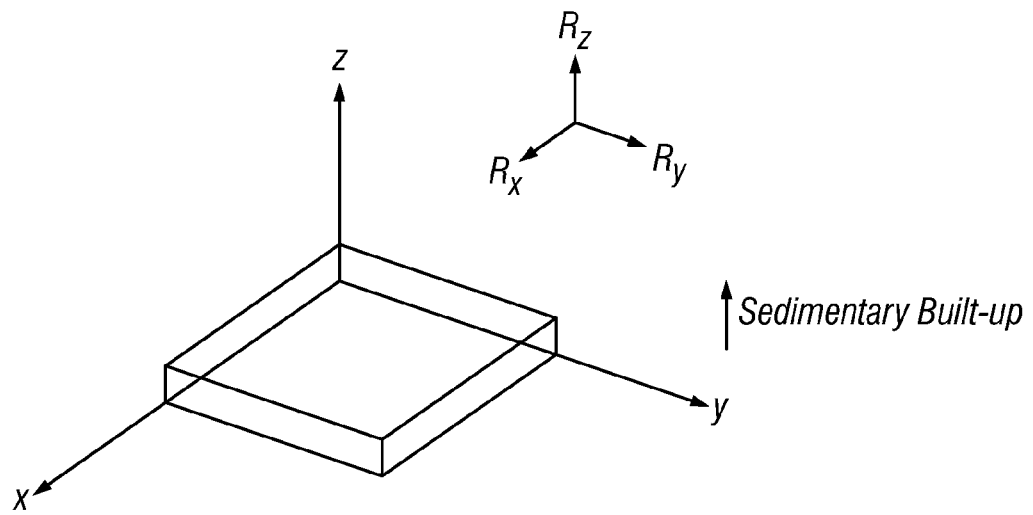
FIG. 10 shows a coordinate system indicating an example coordinate system relating resistivity components to sedimentary buildup.

Due to the nature of sedimentary formations, formation analysis practitioners in the art use the term "horizontal" to denote the plane of the formation (i.e., the x-y plane of FIG. 10), and practitioners use the term "vertical" to denote the direction perpendicular to the plane of the formation (i.e., the z direction of FIG. 10, which is the direction of sedimentary build-up). For convenience in distinguishing between these terms of art and the ordinary directions associated with the earth's gravity, FIGS. 6A and 6B utilize the following terms: "true vertical" indicates the direction of the earth's gravity; "true horizontal" indicates the direction perpendicular to the earth's gravity; "formation vertical" indicates the direction perpendicular to the plane of the formation; and "formation horizontal" indicates the plane of the formation. In this description, the terms "horizontal" and "vertical" are intended to have the meanings associated with "formation horizontal" and "formation vertical," respectively. In FIGS. 6A and 6B, $\delta$ is the hole deviation angle (the angle between the borehole/tool axis and the true vertical), and $\psi$ is the bed dip angle (the angle between the formation bed plane and the true horizontal).

Referring to FIG. 6A, a transmitter coil (antenna) with a magnetic moment $M_T$ can be considered as the superposition of a horizontal magnetic dipole (HMD) and a vertical magnetic dipole (VMD), with corresponding horizontal and vertical component magnetic moments $M_{Th}$ and $M_{Tv}$, respectively, which are given by the equations $$M_{Th} = M_T \sin\theta = I_t A_t \sin\theta \qquad [1]$$

$$M_{Tv} = M_t \cos\theta = I_t A_t \cos\theta \qquad [2]$$

where
$I_t$=the current in the transmitter coil,
$A_t$=the cross-sectional area of the transmitter coil, and
$\theta$=the relative dip angle (the angle between the tool axis and the normal to the formation).

It can be shown that the HMD produces magnetic fields $H_{hx}$ and $H_{hz}$, and the VMD produces magnetic fields $H_{vx}$ and $H_{vz}$ as follows:

$$H_{hx} = \frac{M_T \sin\theta}{4\pi}\left(\frac{e^{ik_h L}}{L^3}\left[3\sin^2\theta - 1 + k_h^2 L^2 \cos^2\theta + \frac{ik_h}{\sin^2\theta}L + ik_h L - 3ik_h L\sin^2\theta\right] - \frac{ik_h}{L^2 \sin^2\theta}e^{ik_h L\beta}\right) \qquad [3]$$

$$H_{hz} = M_T \sin^2\theta \cos\theta \frac{e^{ik_h L}}{4\pi L^3}[3 - k_h^2 L^2 - 3ik_h L] \qquad [4]$$

$$H_{vz} = M_T \cos\theta \frac{e^{ik_h L}}{4\pi L^3}[3\cos^2\theta - 1 + k_h^2 L^2 \sin^2\theta - 3ik_h L\cos^2\theta + ik_h L] \qquad [6]$$

where $$k_h = \sqrt{\omega^2 \mu \left(\varepsilon_h - \frac{i\sigma_h}{\omega}\right)}$$

$$k_v = \sqrt{\omega^2 \mu \left(\varepsilon_v - \frac{i\sigma_v}{\omega}\right)}$$

$$\beta = \sqrt{\cos^2\theta + \left(\frac{k_v}{k_h}\right)^2 \sin^2\theta}$$

$k_h$=the complex wave number in the horizontal direction,
$k_v$=the complex wave number in the vertical direction
$\omega$=the angular frequency (in radians/second) of the transmitter coil=$2\pi f$
f=the frequency of the transmitter coil (in Hertz)
$\mu$=the magnetic permeability of the formation (assume $\mu=\mu_{air}=1$)
$\sigma_h$=the horizontal conductivity of the formation
$\sigma_v$=the vertical conductivity of the formation
$\in_h$=the horizontal dielectric constant (assumed)
$\in_v$=the vertical dielectric constant (assumed)
L=the distance between the transmitter coil and the receiver coil
$i=\sqrt{-1}$ If a receiver is parallel to the transmitter, for a conventional configuration as shown in FIG. 6 in which $\xi_T=\xi_R=90°$, the $H_z$ field in the receiver loop is given by the equation $$H_z = (H_{hx} + H_{vx})\sin\theta + (H_{hz} + H_{vz})\cos\theta \qquad [7]$$

and the induced voltage in the receiver loop is $$V = i\omega A_r \mu H_z \qquad [8]$$

where $A_r$ is the cross-sectional area of the receiver coil. Substituting Eqs. [3], [4], [5], [6], and [7] into Eq. [8] yields $$V = \frac{i\omega\mu A_r A_t I_t}{4\pi L^3}\{(2 - ik_h L)e^{ik_h L} - ik_h L e^{ik_h L\beta}\} \qquad [9]$$

Equation [9] shows that the induced voltage, V, depends on $k_h$ and $\beta$. In turn, $k_h$ depends on $\sigma_h$; and $\beta$ depends on $\sigma_h$, $\sigma_v$, and $\theta$. These relationships indicate that $\theta_v$, and $\theta$ are dependent, and this dependency prevents convergence of a simultaneous solution for $\sigma_h$, $\sigma_v$, and $\theta$, as discussed above.

To break this dependency and enable a solution for $\sigma_h$, $\sigma_v$, and $\theta$, one may tilt either the transmitter or the receiver with respect to the tool axis, as shown in FIG. 6B (transmitter not tilted, receiver tilted). For a transmitter/receiver configuration as shown in FIG. 6B in which $\xi_T=90°$ and $\xi_R<90°$, the $H_z$ field in the receiver loop is given equation $$H_{Z'} = (H_{hx} + H_{vx})\sin\theta' + (H_{vz} + H_{hz})\cos\theta' \qquad [10]$$

Substitution of Eqs. [3], [4], [5], [6], and [10] into Eq. [8] yields $$V = \frac{i\varpi\mu A_r A_t I_t}{4\pi L^3}\left\{2\cos(\theta-\theta')e^{ik_hL}(1-ik_hL) + \frac{ik_hL\sin\theta'}{\sin\theta}(e^{ik_hL}-e^{ik_hL\beta})\right\} \quad [11]$$

where $$\theta' = \theta + \xi_R - 90°$$

$\xi_R$=the angle of tilt of the receiver antenna (i.e., the angle between the plane of the receiver antenna and the tool axis)

$\xi_T$=the angle of tilt of the transmitter antenna (i.e., the angle between the plane of the transmitter antenna and the tool axis).

Equation [11] shows that the induced voltage, V, depends on $k_h$, $\beta$, $\theta$, and $\theta'$. As long as $\theta$ is different from $\theta'$, then $\theta$ can be calculated from three measurements using a multiple spacing or multiple frequency EW resistivity tool. By tilting either the receiver or the transmitter of an EW resistivity sensor (i.e., by making $\theta$ different from $\theta'$), $\sigma_v$ and $\theta$ are decoupled, which enables a solution for $\sigma_h$, $\sigma_v$, and $\theta$ as described below. Although the above formulation is for an untilted transmitter with a tilted receiver, the theory of reciprocity provides that the same result also applies to a tilted transmitter with an untilted receiver. Indeed, both the transmitter and the receiver may be tilted, provided that the respective angles of tilt are not the same, i.e., $\xi_T \neq \xi_R$. For the general case in which both the transmitter and the receiver are tilted at arbitrary angles $\xi_T$ and $\xi_R$, respectively, Eqs. [1] through [11] apply with the substitution of $\theta''$ for $\theta$ where $\theta''=\theta+\xi_T-90°$.

Figure 7:
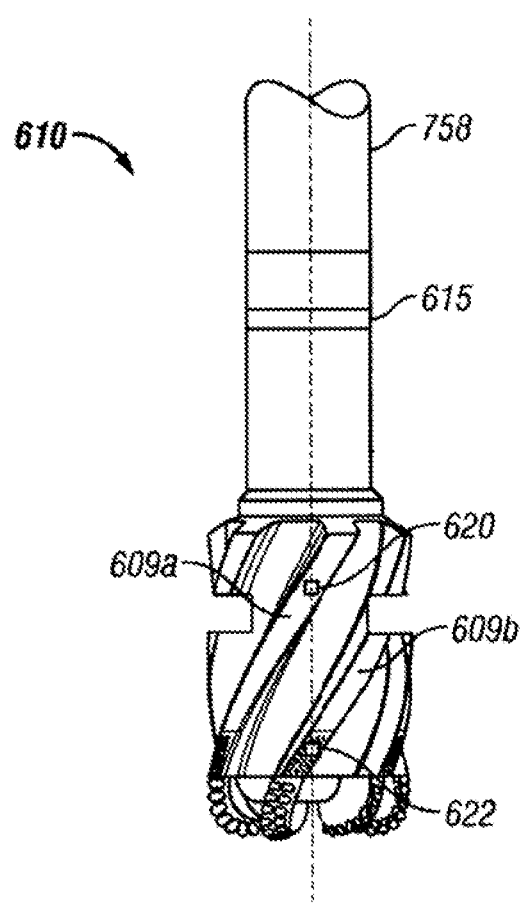
FIG. 7 shows an embodiment of an instrumented bit assembly, wherein the receivers are located in the blades.

FIG. 7 shows yet another embodiment of an instrumented bit assembly 610, wherein the receivers 620 and 622 are located in the blades 609a and 609b. Antenna 615 may be untilted or tilted. This configuration may allow for enhanced accuracy of the resistivity measurement, compared to the configuration of FIG. 2, by reducing the drilling fluid thickness between the receivers 620, 622 and the formation.

Bit Design

Figure 8:
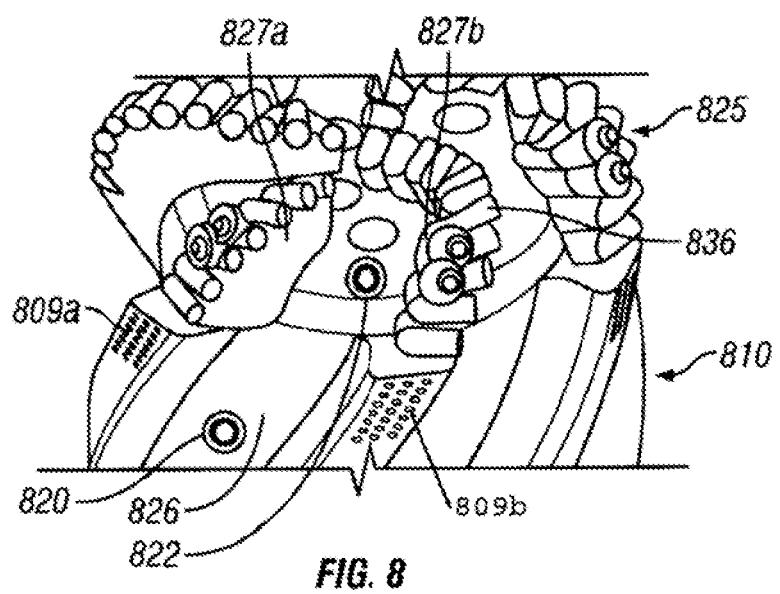
FIG. 8 shows a perspective view of the end portion of an instrumented bit assembly.

FIG. 8 shows a perspective view of the end portion 825 of an instrumented bit assembly 810. The end portion includes face blades 827a and 827b upon which are mounted PDC cutting elements 836. The areas between adjacent face blades are referred to as face fluid channels 826 which are well known in the art. In this embodiment, receiver 822 is recessed into face fluid channel 826. Receiver 820 is located in the trough between near gage blade 809a and 809b.

Figure 9:
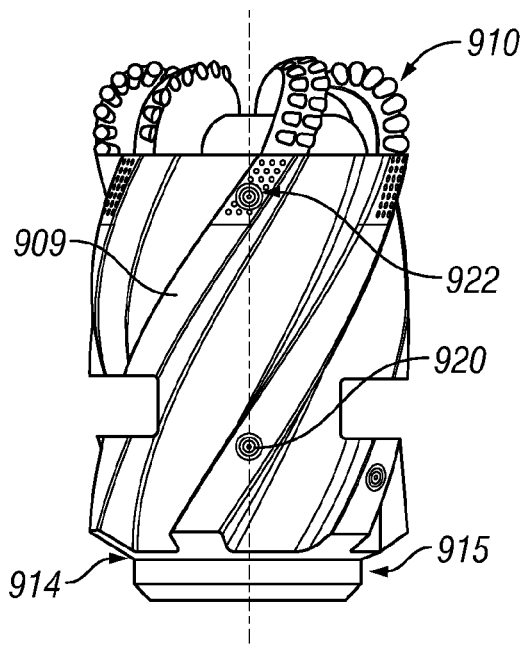
FIG. 9 shows an example of an instrumented bit assembly comprising an antenna positioned on the shank portion of a drill bit.

In another embodiment, see FIG. 9, the instrumented bit assembly 910 has antenna 915 positioned on the shank portion 914 of the drill bit. Receivers 922 and 920 are located on gage blades 909.

Manufacturing Aspects

Electromagnetic Wave Antenna

In the embodiment shown in FIG. 2, the instrumented bit assembly 10 comprises a bit sub 16 which is typically manufactured from alloy steel of a nominal diameter consistent with the MWD system 758 to which it is connected. The circumferential groove or recess 17 into which antenna 15 is fitted can be formed by conventional lathe turning operations.

FIG. 5 shows a tilted axis transmitter antenna 515 which is attached to bit sub 516 also manufactured from alloy steel. In this embodiment, the groove into which the antenna would fit would have to be formed by a different manufacturing process requiring the use of a milling machine due to the orientation of the axis of the transmitter.

Another method of attaching the transmitter antenna (15, 515) would be to strap it to the external surface of the bit sub (16, 516). It could then be covered with a non-conductive material as known in the art.

Receivers

Referring again to FIG. 3a, the cavity 321 can be formed in various methods. When the bit 5 is manufactured from steel, standard milling and drilling processes can be utilized to form the cavity. This method would be utilized for both locating the cavity into a gage blade 9, face blades 827a,b (see FIG. 8), and the troughs and fluid channels between any blades.

If the bit 5 is formed from matrix material which is common in the manufacture of PDC bits, the cavity 321 must be formed in a different manner. The matrix material is formed from tungsten carbide or other hard material infiltrated by a copper based alloy which is not "machinable". A casting former may be used to form the near net shape junk slots, nozzle displacements and cutter pockets when preparing the mold used to manufacture the drill bit. This material can be graphite, sand, ceramic or other materials which after the furnace process can be easily removed from the casting. This technique can be used to form the cavity for the receiver. An alternative method to form the cavities in matrix is plunge EDM. This casting may be done through techniques generally known to those skilled in the art, in which a mold is constructed of an appropriate material (for example, sand, graphite, ceramic, etc.) for use in molding the component. The mold or sub-assembly, or the final part, may also be formed by any of several techniques, including building up through stereo lithography. As another example, "sand printing" may be used, where a mold of the resulting shape is created, and then used as a positive form to create a reverse mold formed of sand in an appropriate resin, that is ultimately hardened in the desired conformity. That reverse mold may then be used to cast the matrix material. Another manufacturing alternative would be to cast the primary shape of gage sleeve 1210 (see FIG. 11) in a conventional manner, but to then use non-traditional machining techniques to form the described apertures, and potentially other conformities. An example of one such non-traditional machining technique is electrical discharge machining ("EDM"), where a series of electrical discharges between a tool electrode and the matrix casting (acting as another electrode), typically in the environment of an intervening dielectric liquid (known as "sinker" or "plunge" EDM), causes the incremental removal of material between the electrodes.

In FIG. 4, transmitter 415 and receivers 420 and 422 are connected to electronic insert 405 through pathways 423 and 445. When the body material of bit sub 416, or drill bit 5, is steel, long bore drilling techniques might be used. When the bit body including stabilizer section is made of matrix, formers would again be utilized to form passageways for the connectors.

Numerous variations and modifications will become apparent to those skilled in the art. It is intended that the following claims be interpreted to embrace all such variations and modifications.

What is claimed is:

1. A system for measuring a resistivity of a formation comprising:
   an instrumented drill bit coupled to a bottom end of a bottomhole assembly;
   at least one electromagnetic wave antenna located in the bottomhole assembly to transmit an electromagnetic wave signal into the formation;
   at least one coil receiver comprising a wire coiled around a magnetic core rod, the at least one coil receiver located in an external surface of the instrumented drill bit and longitudinally spaced apart from the at least one electromagnetic wave antenna to receive the electromagnetic wave signal transmitted through the formation; and electronic circuits operably coupled to the at least one coil receiver to process the received signal to determine a resistivity of the formation proximate the instrumented drill bit.

2. The system of claim 1 wherein a plane of the at least one electromagnetic wave antenna is tilted at a predetermined angle relative to a longitudinal axis of the instrumented drill bit.

3. The of claim 2 wherein the first predetermined angle is in the range of about 0° to about 90°.

4. The system of claim 1 further comprising a second tilted electromagnetic antenna and a third tilted electromagnetic wave antenna co-located at a same predetermined longitudinal location between the first electromagnetic antenna and the instrumented drill bit where a plane of the second tilted electromagnetic wave antenna is tilted by a second predetermined angle from the longitudinal axis of the instrumented drill bit and a plane of the third tilted electromagnetic wave antenna is tilted by a third predetermined angle from the plane of the second tilted electromagnetic wave antenna.

5. The system of claim 4 wherein the second predetermined angle is in the range of about 0° to about 45° and the third predetermined angle is in the range of about 0° to about 90°.

6. The system of claim 4 wherein at least one of the second electromagnetic wave antenna and the third electromagnetic wave antenna comprises a transceiver to transmit and to receive an electromagnetic wave.

7. The system of claim 1 wherein the at least one coil receiver comprises at least two coil receivers axially spaced apart on the instrumented drill bit.

8. The system of claim 1 wherein the at least one coil receiver comprises a plurality of coil receivers mounted at angular locations around the instrumented drill bit to detect a radial resistivity of the formation at the instrumented drill bit.

9. The system of claim 1 wherein at least one of the at least one coil receivers is located in a reduced diameter passage between two near gage blades on the instrumented drill hit.

10. The system of claim 1 wherein the at least one coil receiver is located in a near gage blade on the instrumented drill bit.

11. The system of claim 1 wherein the electronic circuitry is located in at least one of a shank section of the drill bit and a bit sub coupled between the instrumented drill bit and the bottomhole assembly.

12. A method of determining a resistivity proximate a bit of a formation surrounding a borehole comprising:

deploying a bottomhole assembly having an instrumented drill bit attached to a bottom end thereof into a borehole surrounded by the formation;

disposing at least one electromagnetic wave antenna in the bottomhole assembly, the at least one electromagnetic wave antenna being longitudinally spaced apart from the instrumented drill bit;

transmitting at least one electromagnetic wave signal into the formation using the at least one first electromagnetic wave antenna;

detecting the electromagnetic wave signal at least one coil receiver comprising a wire coiled around a magnetic core rod located in an external surface of the instrumented drill bit; and processing the received signals from the at least one coil receiver to determine a resistivity of the formation proximate the instrumented drill bit.

13. The method of claim 12 further comprising tilting a plane of the at least one first electromagnetic wave antenna at a first predetermined angle relative to a longitudinal axis of the instrumented drill bit.

14. The method of claim 12 further comprising a second tilted electromagnetic wave antenna and a third tilted electromagnetic wave antenna co-located at a same predetermined longitudinal location between the first electromagnetic antenna and the instrumented drill bit where the second tilted electromagnetic wave antenna is tilted by a second predetermined angle from the longitudinal axis of the instrumented drill bit and the third tilted electromagnetic wave antenna is tilted by a third predetermined angle from the second tilted electromagnetic wave antenna.

15. The method of claim 14 further comprising transmitting at least one electromagnetic wave signal into the formation using at least one of the second tilted electromagnetic wave antenna and the third tilted electromagnetic wave antenna, and receiving the at least one electromagnetic wave signal at the at least one coil receiver disposed on the instrumented drill bit.

16. The method of claim 15 further comprising switching at least one of the second tilted electromagnetic wave antenna and the third tilted electromagnetic wave antenna between a receiving mode and a transmitting mode.

17. The method of claim 12 wherein processing the received signals from the at least one coil receiver to determine a resistivity of the formation proximate the instrumented drill bit comprises determining the phase difference of the transmitted signal and the received signal and the amplitude ratio of the transmitted signal and the received signal and relating the phase difference and the amplitude ratio to a formation resistivity.

18. The method of claim 12 further comprising receiving the at least one electromagnetic wave signal at each of at least two rotationally spaced coil receivers, relating each of the received signals to an azimuth of the instrumented drill bit, and generating an azimuthal image of the formation proximate the instrumented drill bit based on the received signals.

19. An instrumented drill bit comprising:

a bit shank having at least one gage blade attached thereto;

at least one electromagnetic wave antenna disposed on the instrumented drill bit to transmit an electromagnetic wave signal into a formation surrounding the instrumented drill bit;

at least one coil receiver comprising a wire coiled around a magnetic core rod, the at least one coil receiver, the at least one coil receiver located in an external surface of the instrumented drill bit to receive the transmitted electromagnetic wave signal; and electronic circuits operably coupled to the at least one electromagnetic wave antenna and to the at least one coil receiver to process the received signal to determine a resistivity of the formation proximate the instrumented drill bit.

20. The instrumented drill bit of claim 19 further comprising a bit sub attached to the bit shank.

21. The instrumented drill bit of claim 20 wherein the electronic circuits are located in at least one of, the bit sub, and the bit shank.

22. The instrumented drill hit of claim 19 wherein the at least one coil receiver is located in at least one of: the at least one gage blade, and a reduced diameter part of the bit shank.

23. The instrumented, drill bit of claim 19 wherein the at least one coil receiver comprises a plurality of coil receivers disposed at angular locations around the instrumented drill bit.

* * * * *

UNITED STATES PATENT AND TRADEMARK OFFICE
CERTIFICATE OF CORRECTION

PATENT NO.       : 9,085,959 B2                                         Page 1 of 1
APPLICATION NO.  : 13/262106
DATED            : July 21, 2015
INVENTOR(S)      : Michael S. Bittar, Vadim Minosyan and Gary E. Weaver It is certified that error appears in the above-identified patent and that said Letters Patent is hereby corrected as shown below:

In the Specification

Column 4, Line 45: Replace "axe mounted" with --are mounted--
Column 8, Line 43: Replace "given equation" with --given by the equation--

Signed and Sealed this
Sixteenth Day of February, 2016

Michelle K. Lee
*Director of the United States Patent and Trademark Office*